(12) United States Patent
Fischer et al.

(10) Patent No.: US 7,995,743 B2
(45) Date of Patent: Aug. 9, 2011

(54) METHOD AND APPARATUS FOR NON-DISRUPTIVE TELECOMMUNICATION LOOP CONDITION DETERMINATION

(75) Inventors: Jonathan H. Fischer, Denver, CO (US);
Donald R. Laturell, Oak Hill, FL (US);
Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 1322 days.

(21) Appl. No.: 11/534,918

(22) Filed: Sep. 25, 2006

(65) Prior Publication Data
US 2007/0121907 A1    May 31, 2007

Related U.S. Application Data

(63) Continuation of application No. 09/605,953, filed on Jun. 28, 2000, now Pat. No. 7,113,587.

(51) Int. Cl.
*H04M 3/00* (2006.01)
(52) U.S. Cl. .................................... 379/377; 379/387.01
(58) Field of Classification Search .......... 379/377–385, 379/389.01, 399.017
See application file for complete search history.

(56) References Cited

U.S. PATENT DOCUMENTS

| | | | | |
|---|---|---|---|---|
| 5,646,558 | A | * | 7/1997 | Jamshidi ........................ 326/106 |
| 5,727,056 | A | * | 3/1998 | Lee ........................... 379/399.02 |
| 6,160,885 | A | * | 12/2000 | Scott et al. ................ 379/399.01 |
| 6,567,520 | B1 | * | 5/2003 | Murphy et al. ................ 379/377 |
| 6,631,190 | B1 | * | 10/2003 | Yamamoto et al. ........... 379/380 |
| 7,113,587 | B1 | * | 9/2006 | Fischer et al. ................ 379/377 |

* cited by examiner

*Primary Examiner* — Walter F Briney, III
(74) *Attorney, Agent, or Firm* — Mendelsohn, Drucker, & Associates, P.C.; David L. Cargille; Steve Mendelsohn

(57) ABSTRACT

The invention provides a low cost, simple, circuit for detecting the condition of a telephone line.

4 Claims, 3 Drawing Sheets

METHOD AND APPARATUS FOR NON-DISRUPTIVE TELECOMMUNICATION LOOP CONDITION DETERMINATION

CROSS REFERENCE TO RELATED APPLICATION

This application is a continuation of U.S. patent application Ser. No. 09/605,953 filed Jun. 28, 2000, which is hereby incorporated by reference in its entirety.

FIELD OF THE INVENTION

The invention pertains to telecommunication systems. More particularly, the invention pertains to determining the condition of a telecommunication loop circuit, such as determining whether any equipment coupled to the loop is off-hook.

BACKGROUND OF THE INVENTION

In recent years, there has been substantial expansion in the number and type of telecommunications equipment in common use in households and offices. For instance, it is not unusual for a subscriber to have multiple pieces of telecommunications equipment coupled to a single telephone subscriber loop, e.g., a single tip and ring wire pair. For instance, a household might have a telephone, a facsimile machine, a computer using a modem, and an answering machine hooked up to a single subscriber loop. Other than for voice communications using a telephone, it is possible for only one piece of equipment to use the loop at any given time. If a second piece of equipment goes off-hook while a first piece of equipment is using the loop to transmit or receive data, the noise and change in loop voltage due to the second piece of equipment going off-hook can cause data errors in connection with the first piece of equipment. Accordingly, many automated telecommunication apparatuses such as fax machines and modems are designed to detect the condition of the telephone line to which they are coupled before they go off-hook. Thus, for instance, if a facsimile machine coupled to a subscriber loop is receiving a facsimile (such that the line is off-hook), a computer modem having this feature will first check if the line is already in an off-hook condition before going off-hook itself and suppress an attempt to go off-hook if it detects that the subscriber loop is already off-hook (i.e, that another piece of equipment on the same line is off-hook).

While there are many ways to determine whether a subscriber loop circuit is off-hook, probably the simplest way is to determine the DC voltage on the line. In the United States, subscriber loops are biased to approximately 48 volts DC (Direct Current) when the line is not in use (i.e, when no equipment coupled to that line is off-hook). If a telecommunication device on the line is off-hook, then the voltage drops typically to somewhere in the range of 20 volts or less.

In the prior art, telecommunication equipment manufacturers have utilized voltage comparator circuits to detect the DC voltage across tip and ring of a subscriber loop and to use the comparator output as an on-hook/off-hook indicator signal. FIG. 1 is an exemplary circuit of the prior art. In the circuit of FIG. 1, a full wave rectifier 12 is coupled across tip 14 and ring 16. The tip' output 14a from the rectifier is coupled to a voltage divider 17 comprising resistors 18 and 20. The common node 22 of the voltage divider is coupled to one input of a comparator 24. The other input of the comparator is coupled to a reference voltage 26. The output of comparator 24 is coupled through a high voltage barrier circuit, such as optical coupler 28 to a digital signal processor (DSP) 25. A less expensive electrical (as opposed to optical) coupling circuit, whether inductive or capacitive, would not function well in this application. Particularly, the signal across tip and ring can change too slowly to be distinguished from noise by an electrical coupling circuit.

Of course, it will be understood by those of skill in the art that substantial additional circuitry is coupled across tip and ring that is not illustrated in FIG. 1 in order to provide the functionality of the circuit (e.g., to send and receive facsimiles) and that FIG. 1 merely shows the loop status detection circuitry.

The reference voltage and values of the resistors 18 and 20 in the resistor voltage divider 17 are selected so that the comparator output changes state somewhere between the on-hook voltage (approximately 48 volts in the U.S.) and the off-hook voltage (approximately 20 volts in the U.S.). Accordingly, for example, the reference voltage and divider network resistor values can be selected so that the switching point of the comparator is at approximately 30 volts across tip and ring. The digital signal processor is programmed to disable the telecommunication apparatus from going off-hook when the voltage across tip and ring is less than 30 volts. Otherwise, the DSP allows the apparatus to operate normally.

Except for the DSP, the circuit shown in FIG. 1 is specifically dedicated to the aforementioned feature. The DSP typically would be a DSP that already exists in the circuit for performing some or all the functions of the actual device (e.g., facsimile machine) and would merely have additional functionality built into it for receiving the comparator output signal and selectively enabling/disabling the device from going off-hook responsive thereto.

The telecommunication loop detection circuit itself must not disrupt the loop when checking the loop voltage. To do so would, of course, defeat its very purpose. Accordingly, it is an object of the present invention to provide a telecommunication loop condition detector that is simpler and lower in cost than prior art detectors. The telecommunication device must not disturb any call function with any audible noise injection and must not significantly alter the loop impedance.

SUMMARY OF THE INVENTION

The invention provides a low cost, simple, circuit for detecting the condition of a telephone line. Particularly, the inventive circuit utilizes an existing low power analog-to-digital converter that is already incorporated into the telecommunication device and used for other functions such as caller ID and ring detection. The additional circuitry comprises a voltage divider coupled between tip and ring and a transistor having its control input (e.g., gate or base) coupled to the common node of the voltage divider, one of its current flow terminals (e.g., collector, emitter, drain, or source) coupled to the analog input of the analog-to-digital converter, and the other current flow terminal coupled to ground. The A/D converter is also coupled to tip and ring, respectively, through a pair of capacitors for detecting the AC voltage on the line for purposes of caller ID and/or ring detection.

The resistors of the voltage divider are proportioned such that the common node voltage of the divider is above the threshold voltage of the transistor, thus turning it on, when the voltage across tip and ring is at the on-hook voltage of approximately 48 volts, and is below the transistor threshold voltage, thus turning it off, when the voltage across tip and ring is at the off-hook voltage of approximately 20 volts. Accordingly, when the transistor is on, the A/D converter input is driven to ground. When it is off, the A/D converter input goes to its self biased voltage. Accordingly, the digital output of the A/D converter is an indication of the voltage on the line and thus whether it is on-hook or off-hook. The output of the A/D converter can be coupled to a digital signal processor that disables the device from going off-hook if the A/D converter detects that the loop is off-hook.

In an alternative embodiment, the voltage across one resistor of a resistor voltage divider that is coupled between tip and ring is provided to the analog input of the low power analog-to-digital converter through the current flow terminals of one or more transistors so that the A/D converter receives a scaled version of the actual tip to ring voltage rather than simply a two state on-hook/off-hook signal. The DSP may use the specific loop voltage information provided in this embodiment to determine additional information about the loop.

DETAILED DESCRIPTION OF THE INVENTION

The present invention is a low-cost, simple, circuit for detecting line voltage across tip and ring of a telecommunication subscriber loop that primarily utilizes circuitry that is commonly already incorporated in a data access arrangement (DAA) of telecommunication equipment. The circuit can be used to detect whether the line is in an off-hook condition and particularly can be used for disabling equipment from going off-hook if the line already is in use (i.e., off-hook) by another piece of telecommunication equipment. A preferred embodiment of the invention is particularly adapted for use in telecommunication equipment incorporating the CSP 1035 Silicon DAA manufactured by Lucent Technologies, Inc. of Murray Hill, N.J., the assignee of the present application. However, it will be obvious to those of skill in the telecommunication equipment field that the invention can be utilized with other DAA designs.

A DAA commonly includes circuitry for performing various functions including ring detection, DC loop hold, hook control and pulse, parallel phone sense and data/voice relay. Some or all of these functions may be performed by a programmed DSP. Some DAAs includes a low power analog-to-digital converter coupled to receive a differential signal from the tip and ring line pair so that a DSP can perform functions in connection with caller ID and ring detection.

Figure 1:
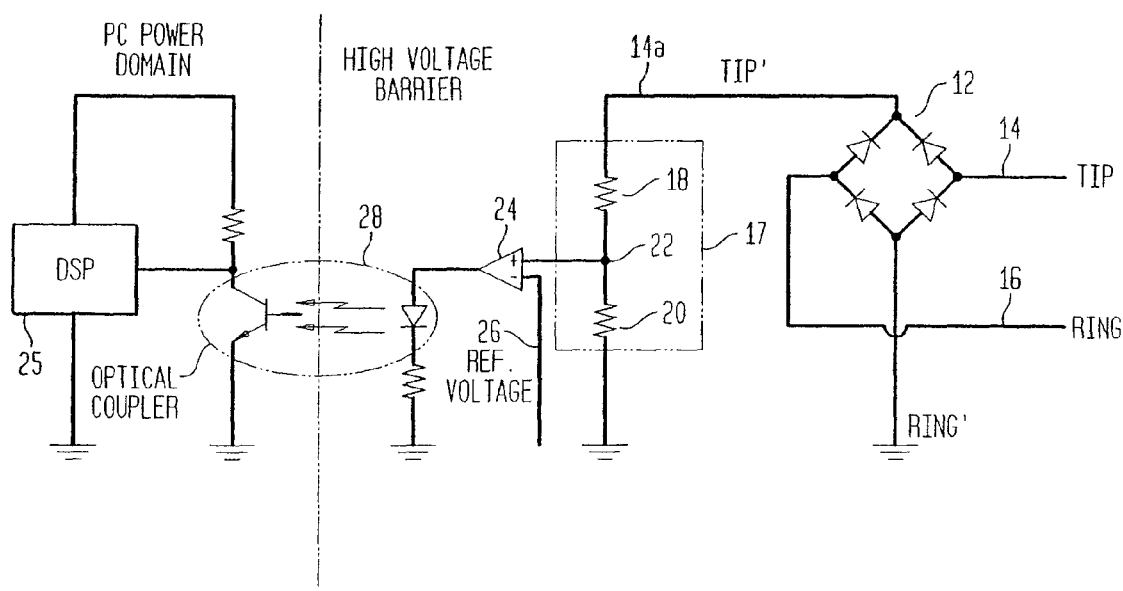
FIG. 1 is a circuit diagram of a telecommunication line status detection circuit of the prior art.
Figure 2:
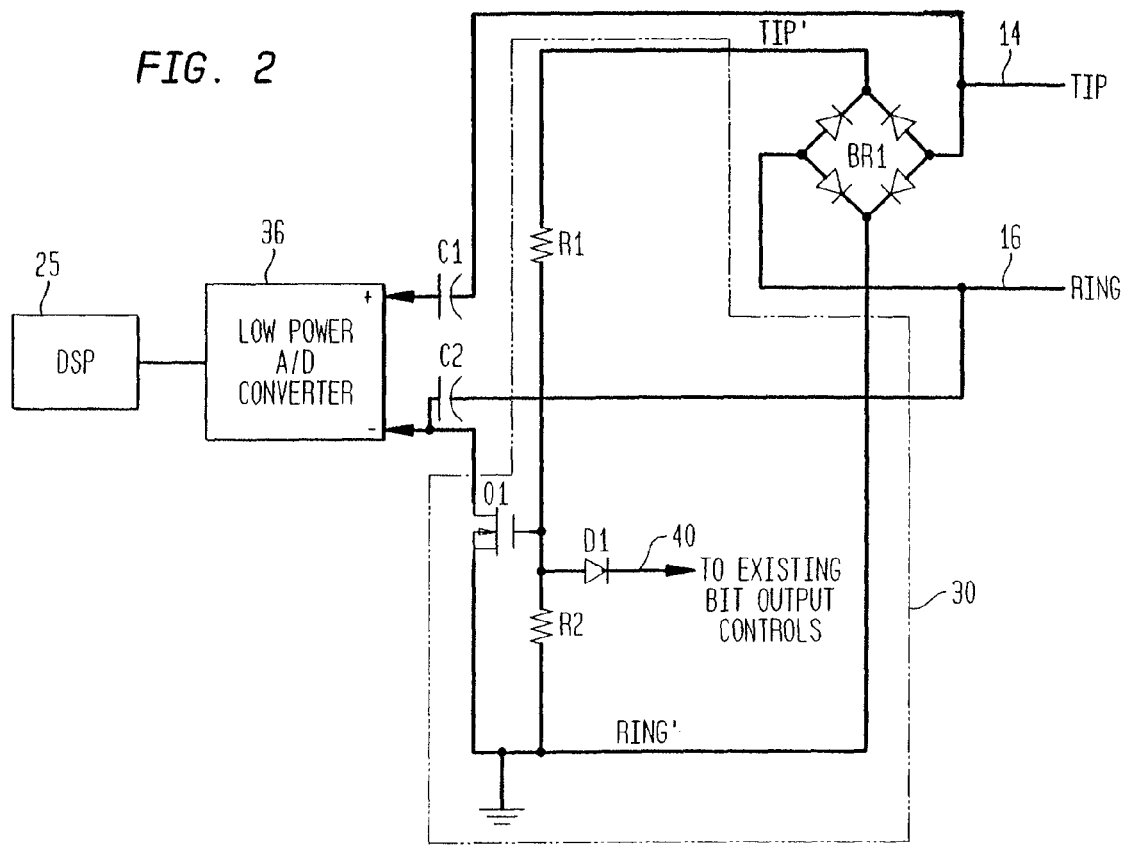
FIG. 2 is a circuit diagram showing a telecommunication line status detection circuit in accordance with the first embodiment of the present invention.

The circuitry of the present invention is shown in FIG. 2 and appears within dashed box 30 in FIG. 2. FIG. 2 also illustrates some of the circuitry that already commonly exists in a DAA and particularly the circuitry that is relevant to the operation of the inventive circuit 30. The detection circuit 30 comprises resistors R1 and R2, diode D1 and transistor Q1. In particular, resistors R1 and R2 comprise a resistor voltage divider coupled between tip' and ring'. Note also that ring' is coupled to analog ground. The common node N1 between resistors R1 and R2 is coupled to the control terminal (the gate, in the case of a MOSFET) of transistor Q1. Node N1 also is coupled to a control signal line 40 through diode D1.

This control signal line 40 pre-exists in many DAAs and is designed to remain at a logic low level until just before the equipment attempts to go off-hook, at which time the control signal goes to logic high. As will become clear from the description below, operation of the present invention may interfere with other functions of the equipment, such as caller ID and ring detection. Accordingly, this control line is used to disable operation of the inventive detection circuit until just before the equipment attempts to go off-hook so that, for instance, caller ID can operate without interference until the equipment is ready to go off-hook.

The current flow terminal of transistor Q1 (source and drain in the case of a MOSFET) are coupled between ring' (ground) and one of the inputs of differential, low power, A/D converter 36.

The low power A/D converter is a differential converter that converts a differential analog voltage input across its two inputs to a digital value. Accordingly, the "+" and "−" inputs of the converter are coupled to tip and ring of the telephone line through capacitors C1 and C2, respectively.

Capacitors C1 and C2 block DC current on tip and ring from the A/D converter so that only the AC current across tip and ring reaches the A/D converter through those paths. The digital output of the A/D converter is coupled to a digital signal processor that reads the AC information and performs caller ID and ring detection functions as known in the prior art.

Tip and ring are also coupled to a full wave rectifier BR1 to produce tip' and ring' signals. The full wave rectifier is employed simply to assure that tip' is always positive compared to ring'. Specifically, it is possible that the polarity of tip and ring can be reversed. Rectifier BR1 assures that tip' is always more positive than ring'.

When the control signal is at logic low, node N1 is essentially coupled to ground thus keeping transistor Q1 turned off. With transistor Q1 turned off, detection circuit 30 has no affect on the analog input of A/D converter 36. Accordingly, the AC signals from tip and ring are received by the A/D converter 36 without interference, which signals can be used for caller ID, ring detection and similar functions.

When the signal line goes high, diode D1 is essentially open circuited and the resistor divider formed by R1 and R2 will selectively turn transistor Q1 on or off. In particular, resistors R1 and R2 are ratioed relative to each other so that the voltage at node N1 is greater than the threshold voltage of Q1 when the voltage between tip' and ring' is at the on-hook voltage of the line and will be below the threshold voltage of transistor Q1 when the voltage between tip' and ring' is at the off-hook voltage level.

As previously mentioned, the standard on-hook DC voltage across tip and ring for a subscriber loop in the United States is approximately 48 volts, while standard off-hook DC voltage across tip and ring is approximately 20 volts. Accordingly, resistors R1 and R2 can have a ratio relative to each other so that the common node voltage will be the threshold voltage of transistor Q1 when the voltage between tip and ring is anywhere between just above 20 volts and just below 48 volts.

The inputs of the A/D converter are both biased to the common mode voltage. Accordingly, when transistor Q1 is turned off, the DC voltage across the differential inputs of A/D converter 36 is approximately 0 volts. However, when transistor Q1 is turned on, the − input terminal of the A/D converter is driven to ground through the current flow terminal of transistor Q1 while the + input terminal remains at common mode voltage. Accordingly, when transistor Q1 is turned on, A/D converter 36 detects one half full scale voltage.

Accordingly, in operation, when the control signal 40 goes high, thus open circuiting diode D1, the A/D converter will detect 0 volts across its differential inputs if the line is off-hook (and thus transistor Q1 is turned off). However, if the line is on-hook, transistor Q1 is turned on so that A/D converter 36 will detect one half full scale voltage across its differential inputs.

The output of the A/D converter 36 is coupled to the digital signal processor 25. The digital signal processor 25 is programmed to prevent the equipment from going off-hook if it receives approximately 0 volts at this instant and to allow the equipment to go off-hook if it receives one half full scale voltage at this instant.

Accordingly, the inventive circuit provides a non-disruptive line condition detection function with a minimum of additional circuitry. In the embodiment shown in FIG. 2, for instance, the circuit adds only two resistors, a diode and a transistor to the DAA.

Figure 3:
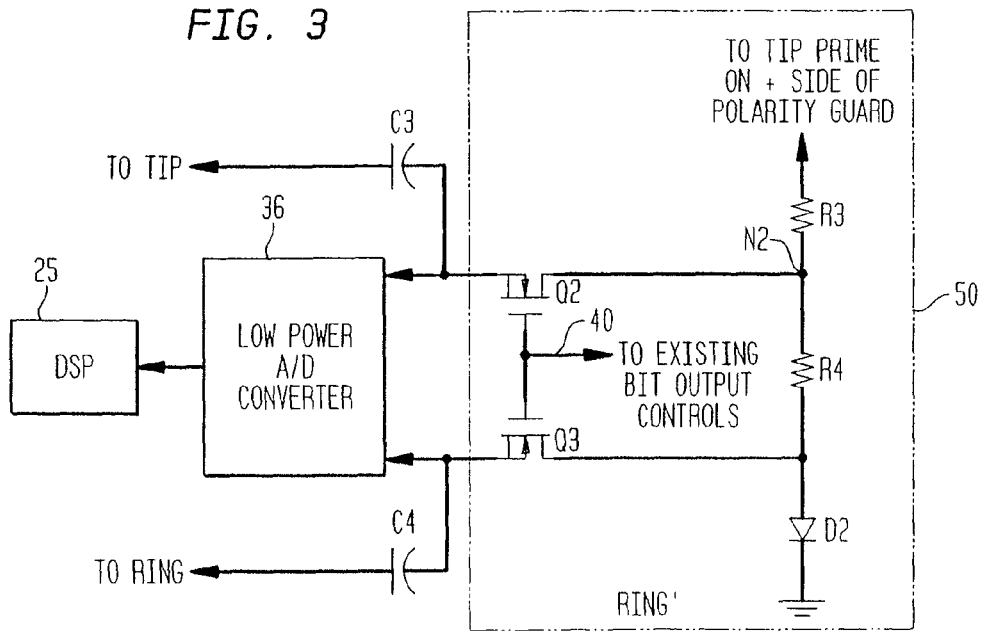
FIG. 3 is a circuit diagram showing a telecommunication line status detection circuit in accordance with a second embodiment of the present invention.

FIG. 3 illustrates an alternative embodiment 50 of the present invention in which the A/D converter detects a scaled version of the actual voltage across tip and ring rather than merely a two state (on-hook/off-hook) signal. The alternative circuit is shown in box 50. It comprises resistors R3 and R4, diode D2 and transistors Q2 and Q3. Resistors R3 and R4 form a resistor divider network coupled between tip' and ground, just as in the FIG. 2 embodiment, except that diode D2 is coupled between the bottom of resistor R4 and ground. Diode D2 assures that the source terminals of transistors Q2 and Q3 are referenced to ground. In essence, diode D2 acts as a regulator, keeping the voltage at the source terminal of transistor Q3 at or above 0.7 volts (the bias voltage of the diode).

Transistor Q2 has its current flow terminals coupled between the common node N2 between resistors R3 and R4 and one of the differential inputs of the A/D converter 36. Transistor Q3 has one of its current flow terminals coupled between resistor R4 and diode D2 and its other current flow terminal coupled to the other differential input of the A/D converter. The control terminals (gates) of both transistors Q2 and Q3 are coupled to the aforementioned control signal 40.

In operation, transistors Q2 and Q3 are turned off until the control signal 40 goes high just before the device attempts to go off-hook. With transistors Q2 and Q3 turned off, circuit 50 will have no effect on the operation of A/D converter 36. However, when the control signal 40 goes high, transistors Q2 and Q3 will be turned on. Accordingly, A/D converter 36 will detect the voltage across resistor R4 at its two differential input terminals. Since resistors R3 and R4 (and diode D2) form a voltage divider across tip' and ring', this voltage is simply a scaled version of the voltage between tip' and ring'. Accordingly, the DSP which receives the output of the A/D converter will receive a scaled version of the DC line voltage and can react accordingly. Thus, with the addition of one extra transistor over the embodiment of FIG. 2, the embodiment of FIG. 3 provides the actual tip to ring DC voltage to the DSP. The DSP can use this more specific information about the DC condition of the loop as needed.

Figure 4:
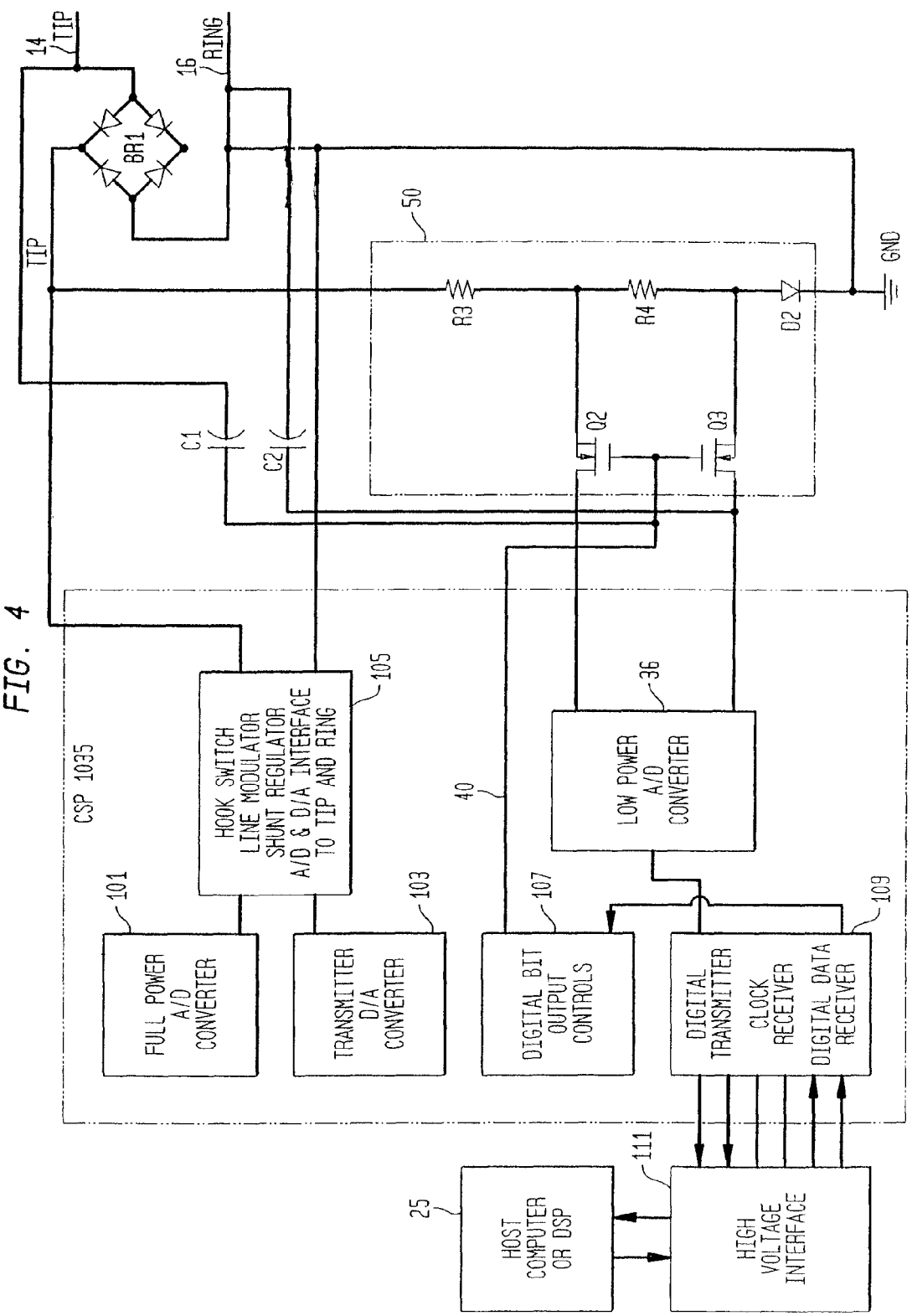
FIG. 4 is a circuit diagram of one particular data access arrangement into which the present invention has been incorporated.

FIG. 4 is a partial block, partial schematic diagram of an exemplary DAA 100 incorporating the present invention. The circuitry of the second embodiment of the present invention is shown in dashed box 50. The aforementioned DSP and low power A/D converter are shown at 25 and BR1, respectively. The DAA 100 further includes a digital bit output controller 107 which is the source of the aforementioned control signal 40 as well as other control signals in the DAA. The DAA further includes a full power receive A/D converter 101 and transmit D/A converter, both of which couple to the tip and ring line pair through circuitry 105 for conditioning signals. Circuitry 105 performs various function, including hook switch line modulation, shunt regulation A/D and D/A interfacing. The DSP 25 receives the digital output data from the A/D converter 36 through a digital transmitter, shown as part of circuit 109, and a high voltage interface circuit 111.

Since the DC line voltage is encoded by the low power A/D converter 36, the high voltage interface circuit may be a less expensive and complex electrical high voltage interface circuit and need not be optical. In essence, the A/D converter modulates the DC voltage signal. Thus, there is no slow moving voltage that must go through the high voltage interface that would preclude the use of an electrical, as opposed to an optical, high voltage interface.

The DSP also sends digital information to various circuits through the high voltage interface circuit 111 and a digital data receiver portion of circuit 109. For instance, the DSP 25 communicates with the digital output bit controller 107 through circuits 111 and 109 and thus can control signal 40 as needed. The DSP 25 includes algorithms for performing various functions, including line status detection in accordance with the present invention, ring detection, and caller I.D. functions based on the signals that are received through the low power A/D converter 36. DAA 100 of FIG. 4 is merely an exemplary DAA employing the present invention. It should be clear to those of skill in the related arts that the invention can be employed in other DAAs also.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A circuit for detecting whether a telecommunication line is off-hook, said telecommunication line comprising tip and ring signal lines, said circuit comprising:
   a voltage divider for coupling between said tip and ring lines and having first and second nodes across which appears a scaled version of a voltage across said tip and ring lines;
   a differential analog-to-digital converter having first and second analog input terminals and a digital output terminal;
   a signal line for selectively enabling said circuit when said signal is in a first state and disabling said circuit when said signal is in a second state;
   a first transistor having a control terminal coupled to said signal line and first and second current flow terminals coupled between said first node and said first input terminal of said analog-to-digital converter;
   a second transistor having a control terminal coupled to said signal line and first and second current flow terminals coupled between said second node and said second input terminal of said analog-to-digital converter, wherein:
   when said signal line is in said first state, said analog-to-digital converter receives a scaled version of the voltage across said tip and ring lines, and, when said signal line is in said second state, said analog-to-digital converter receives no signal from said voltage divider;

said voltage divider comprises a first resistor having a first terminal coupled to a first one of said tip and ring lines and a second terminal coupled to said first node and a second resistor having a first terminal coupled to said first node and a second terminal coupled to said second node; and the circuit further comprises a diode coupled between said second node and an other one of said tip and ring lines, such that said diode biases one of said current flow terminals of said second transistor to a voltage that is greater than a voltage of said other one of said tip and ring lines.

2. The circuit of claim 1 further comprising:

a processor coupled to said digital output of said analog-to-digital converter, said processor adapted to determine whether said telecommunication line is off-hook responsive to a signal on said digital output of said analog-to-digital converter.

3. A telecommunication apparatus for coupling to a telecommunication link, said telecommunication link comprising tip and ring lines that are biased to a first voltage when said link is on-hook and a second voltage when said link is off-hook, said apparatus comprising:

a processor;

a first circuit for taking said apparatus off-hook so that said apparatus may receive or transmit information via said telecommunication link;

a voltage divider for coupling between said tip and ring lines and having first and second nodes across which appears a scaled version of a voltage across said tip and ring lines;

a differential analog-to-digital converter having first and second analog input terminals and a digital output terminal;

a signal line for selectively enabling said circuit when said signal is in a first state and disabling said circuit when said signal is in a second state;

a first transistor having a control terminal coupled to said signal line and first and second current flow terminals coupled between said first node and said first input terminal of said analog-to-digital converter;

a second transistor having a control terminal coupled to said signal line and first and second current flow terminals coupled between said second node and said second input terminal of said analog-to-digital converter, wherein:

when said signal line is in said first state, said analog-to-digital converter receives a scaled version of the voltage across said tip and ring lines, and, when said signal line is in said second state, said analog-to-digital converter receives no signal from said voltage divider; and said processor is adapted to disable said first circuit responsive to said analog-to-digital converter receiving said second voltage and enable said first circuit responsive to said analog-to-digital converter receiving said first voltage;

said voltage divider comprises a first resistor having a first terminal coupled to a first one of said tip and ring lines and a second terminal coupled to said first node and a second resistor having a first terminal coupled to said first node and a second terminal coupled to said second node; and said voltage divider further comprises a diode coupled between said second node and an other one of said tip and ring lines, such that said diode biases one of said current flow terminals of said second transistor to a voltage that is greater than a voltage of said other one of said tip and ring lines.

4. The apparatus of claim 3 further comprising:

said processor is coupled to said digital output of said analog-to-digital converter and adapted to determine whether said telecommunication line is off-hook responsive to a signal on said digital output of said analog-to-digital converter.

* * * * *